Dec. 17, 1957     A. W. PECK     2,816,812
AMMONIA CORROSION INHIBITOR FEED SYSTEM
Filed Dec. 29, 1952

INVENTOR.
A. W. PECK
BY Hudson and Young
ATTORNEYS

United States Patent Office 2,816,812
Patented Dec. 17, 1957

2,816,812

AMMONIA CORROSION INHIBITOR FEED SYSTEM

Alvin W. Peck, Bartlesville, Okla., assignor to Phillips Petroleum Company, a corporation of Delaware Application December 29, 1952, Serial No. 328,493

4 Claims. (Cl. 21—2.5)

This invention relates to a process and apparatus for preventing corrosion of oil storage tanks. One aspect of this invention relates to a method and apparatus for automatically introducing a neutralizing agent into the vapor space of an oil storage tank. Another aspect of this invention relates to means for adjusting and controlling the flow of anhydrous ammonia through the apparatus.

Since the beginning of the petroleum industry, corrosion has been a major problem, costing relatively large sums of money. The principal problem in pipeline storage tanks arises because of the rapid destruction of the tank roof through corrosive action of acids formed within the tanks. The worst corrosion is due to the high hydrogen sulfide content of the crude oil handled, which hydrogen sulfide in the presence of water and oxygen sets up highly corrosive conditions. Most crude oils contain water, and the oxygen is pulled into a tank each time it cools in the late afternoon or early evening. This cooling process also causes moisture to condense on the tank roof, especially on such irregular surfaces as girders, latches, bolt heads, etc., and the hydrogen sulfide dissolves in this water in the presence of oxygen forming an acid which corrodes the metal roof. This type of corrosion can be stopped by injecting a normally gaseous neutralizing agent, such as anhydrous ammonia into the vapor space of a tank where it neutralizes the acid. While a layer of ammonium polysulfide will build up on all irregular surfaces, the steel will not be harmed if the pH is maintained at about 7.5–8.0.

That ammonia is particularly effective in reducing corrosion in oil storage tanks is well known, and it has been and is being used extensively for this purpose. The usual methods of introducing ammonia into storage tanks are either by means of a batch injection late in the afternoon or by very slowly bleeding the ammonia into the tanks over the whole twenty-four hour period. Because corrosive action results only when water and oxygen are present in a tank and the cooling process causes the moisture to condense on the roof and walls, it is highly desirable to provide a method and apparatus for automatically introducing anhydrous ammonia into oil storage tanks during this critical period.

The objects of this invention will be attained by the various aspects of the invention.

An object of the present invention is to provide a method and apparatus for automatically introducing anhydrous ammonia into oil storage tanks in order to prevent corrosion of the roof and walls.

Another object is to provide a novel apparatus for supplying a neutralizing agent to storage tanks during periods when corrosive conditions exist therein.

Still another object of the present invention is to provide means for automatically terminating the supply of ammonia to oil storage tanks when the need therefor has ceased to exist.

Various other objects of this invention will become apparent to those skilled in the art from the accompanying disclosure and the drawings.

Figure 1:
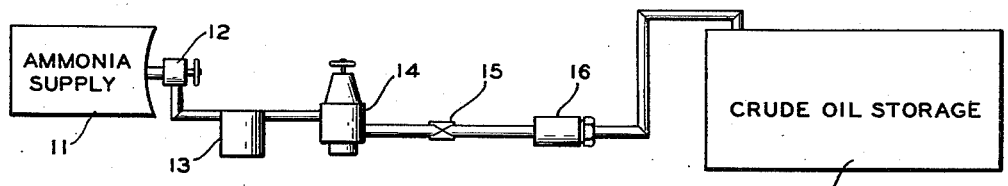
Figure 1 illustrates a flow plan by which the process according to the present invention may be carried out.

Referring particularly to Figure 1 of the drawings, an ammonia source tank or cylinder 11 having the usual valve 12 is connected by means of suitable tubing through a strainer 13, a high pressure regulator 14, a metering orifice 15 and a low pressure regulator 16. Numeral 17 represents an oil storage tank into the top of which the tubing discharges. Since ammonia readily attacks brass, none of the parts of the apparatus should be composed of this metal.

Figure 2:
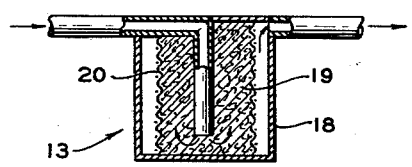
Figure 2 is a sectional elevation of a strainer used in the system of this invention.

Referring to Figure 2 of the drawings, which illustrates diagrammatically a strainer, numeral 18 designates a cylindrical body which may in one form be approximately 2" in diameter and 3" high and tapped for a ¼" pipe. This strainer contains a pad of filter material, such as glass wool 19, supported by a screen 20 which can be made of a material such as stainless steel.

Figure 3:
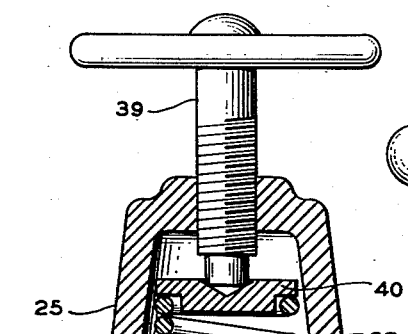
Figure 3 is a sectional elevation of a high pressure regulator especially adapted for use in the present invention.

Referring to Figure 3 of the drawings, there is illustrated a high pressure regulator 14 which consists of an upper body member 25 and a lower body member 26 between which is disposed a diaphragm 27. The under side of lower body member 26 is threaded to take plug 28 which serves as a seat for compression spring 29 and as a guide for valve stem 30. Compression spring 29 tends to force valve head 31 upward so that resilient gasket material 32 is seated against beaded edge 33 of body member 26. Lower body member 26 has an outlet conduit 34 and an inlet conduit 35, which lead into upright conduit 36 which extends downwardly through body member 26. The two conduits, 34 and 35, are arranged so that only conduit 34 communicates to the under side of diaphragm 27 through conduit 36 when resilient gasket material 32 is seated against beaded edege 33 of body member 26. Upper body member 25 contains a compression spring 37 which sits in an annular slot in horizontal plate 38 which in turn rests on diaphragm 27. Screw member 39 is threaded through the top of 25 and with a second horizontal plate 40 provides means for manually compressing and releasing spring 37. Upon compressing spring 37, diaphragm 27 comes into contact with the head 41 of vertical member 42 which rides in upright conduit 36. The lower end of member 42 fits into a recess in the top of valve head 31 so that when the movement of diaphragm 27 forces member 42 downward, valve head 31 also moves downward against the pressure of spring 29, and resilient gasket material 32 is unseated from beaded edge 33 of body member 26.

Figure 4:
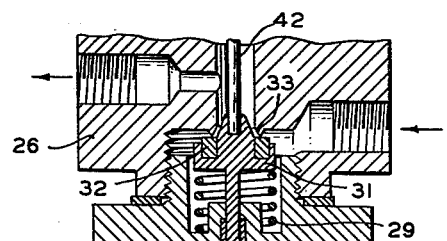
Figure 4 is a sectional elevation of a modification of the high pressure regulator.

Figure 4 of the drawings illustrates a preferred modification of the high pressure regulator shown in Figure 3. Identical numerals are used in the two drawings to indicate corresponding parts. Cam lever 43 is pivoted at point 45 in slot 44 of plug 28. When cam lever 43 is in a horizontal position, as shown in Figure 4, valve stem 30 and valve head 31 are forced upwardly so that resilient gasket material 32 is seated against the beaded edge 33 of lower body member 26. When cam lever 43 is in a vertical position, it is not in contact with valve stem 30.

Figure 5:
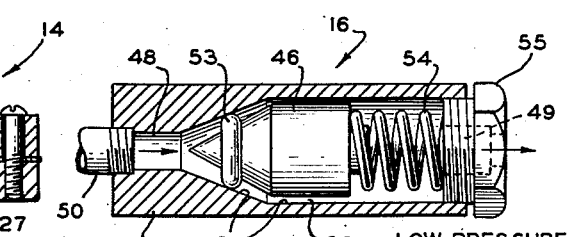
Figure 5 is an elevational view in cross section, diagrammatically illustrating a low pressure regulator.

Figure 5 of the drawings illustrates a low pressure regulator which takes the form of a horizontal check valve designated as 16. The valve body 47 is cylindrical in shape and extending horizontally throughout its length is conduit 48 which has outlet 49 and inlet 50. The sides 51 of conduit 48 on the inlet side are tapered so as to form a valve seat. Riding within valve body 47 is valve plug 46, also tapered on its upstream end so as to fit into the tapered part of conduit 48. The diameter of valve plug 46 is less than the diameter of conduit 48 so that a passageway 52 is formed between valve body 47 and valve plug 46. The tapered sides of valve plug 46 have an O-ring insert 53 which insures a positive seal when the valve plug 46 is in its closed position. Follower 55 is threaded into the downstream end of valve body 47, and serves as a seat for resilient member 54 whose other end is seated against the downstream end of valve plug 46. The tension on resilient member 54 is adjusted by means of follower 55 so that valve plug 46 remains in its closed position except when the pressure on the outlet side is sub-atmospheric at which time valve plug 46 will be forced open.

Various alterations and modifications of the elements of Figure 1 will be practical without departing from the scope of this invention. As shown, a horizontal check valve is being used as a low pressure regulator, but an ordinary gas regulator, with minor changes so that negative load can be applied to the upper side of the diaphragm, can be employed. Also any filter suitable for removing foreign matter from an ammonia stream can replace the strainer.

Operation

In the operation of the apparatus of Figure 1, with valve 12 open, ammonia in liquid phase enters the apparatus and as shown in Figure 2 passes through the glass wool 19 in strainer 13 so as to remove any foreign matter the ammonia may contain. The anhydrous ammonia on leaving strainer 13 flows into high pressure regulator 14 through inlet conduit 35 as shown in Figure 3. Now, assuming that spring 37 is compressed so that valve head 31 can move away from its seat, whether or not the ammonia will flow through 13 is dependent upon conditions as they exist in storage tank 17. During normal daytime operation, the pressure within tank 17 will be equal to or greater than atmospheric pressure. Referring to Figure 5, as stated above, resilient member 54 is so adjusted that when pressure in tank 17 is under a pressure equal to or greater than atmospheric pressure, valve plug 46 is maintained in a closed position. With valve plug 46 of the low pressure regulator in the closed position, referring again to Figure 3, pressure in outlet conduit 34 will increase until diaphragm 27, in communication with conduit 34 through upright conduit 36, will be forced upward, thus releasing vertical member 42 and allowing spring 29 to force resilient gasket material 32 against beaded edge 33 of body member 26, thereby stopping the flow of ammonia through high pressure regulator 14.

In the late afternoon and early evening, a cooling process takes place whereby oxygen is pulled into storage tank 17, and moisture condenses on the tank walls and roof. It is during this period that corrosive conditions exist and when it is especially desirable that the corrosion inhibitor ammonia enter the vapor space of the tank. During the daytime period these corrosive conditions are not present, and as indicated above ammonia is not then passing through the apparatus, but has been stopped through the combined operation of low pressure regulator 16 and high pressure regulator 14. As a result of the cooling, previously referred to, pressure in storage tank 17 is sub-atmospheric. Referring to Figure 5, under these conditions, because of the pressure of spring 54, valve plug 46 is maintained in an open position and ammonia passes through conduit 48 and into the vapor space of storage tank 17. When pressure within the tank has built up to atmospheric pressure, valve plug 46 will close and, as discussed above, the supply of ammonia will be cut off by high pressure regulator 14. The ammonia neutralizes the acid on the walls and roof. As the pressure in tank 17 again becomes sub-atmospheric, valve plug 46 in Figure 5 opens and the pressure against diaphragm 27 in the high pressure regulator of Figure 3 is released, moving vertical member 42 downward and forcing resilient gasket material 32 away from beaded edge 33 of lower body member 26, thereby allowing ammonia to flow through high pressure regulator 14. The pressure of the fluid ammonia in passing through high pressure regulator 14 is reduced from tank pressure to approximately 4–5 p. s. i. The ammonia on leaving high pressure regulator 14 is metered by passing through orifice 15 from which it enters low pressure regulator 16.

By utilizing a preferred modification of high pressure regulator 14 as illustrated in Figure 4, a rapid and positive means is provided for interrupting the flow of ammonia in the apparatus. By moving cam lever 43 to a horizontal position, resilient gasket material 32 is seated against beaded edge 33 of lower body member 26, thus positively closing high pressure regulator 14. When it is desired to start operating again, cam lever 43 is forced down to a vertical position. Pressure on valve head 31 is now supplied only by spring 29, and high pressure regulator 14 can resume normal operation as described above.

From the above description, it is apparent that the operation of the apparatus is continuous and automatic, the ammonia being supplied to the vapor space of the storage tank whenever the pressure therein is sub-atmospheric. Should it be desired to supply ammonia to a storage tank during more extended periods, resilient member 54 of low pressure regulator 16 in Figure 5 can be adjusted by means of follower 55 so that valve plug 46 will remain open when pressures equal to or above atmospheric pressure exist within storage tank 17.

The apparatus and method for introducing anhydrous ammonia into oil storage tanks as described in this application may be used for other processes than the one specifically mentioned. It would be applicable to any situation where corrosive conditions exist in a part of a system which is periodically subjected to fluctuations of pressure. Further, the apparatus and method of this invention may be utilized in situations where it is desired to introduce normally gaseous compounds into a system in response to pressure changes within that system. Also, other neutralizing agents may be advantageously used, and it is not intended to restrict the apparatus and process to anhydrous ammonia. Examples of other neutralizing agents which may be used are formaldehyde, methylamine, ethylamine, dimethylamine, and trimethylamine.

It is to be understood that the form of the invention herewith shown and described is to be taken as a preferred example of the same, and that various changes in shape, size and arrangement of parts may be resorted to without departing from the spirit of this invention or the scope of the subjoined claims.

I claim:

1. Apparatus for automatically introducing a neutralizing agent into the vapor space of an oil storage tank which comprises, in combination, a source of neutralizing agent; conduit means connecting said source of neutralizing agent to said vapor space of said storage tank; means disposed in said conduit means for reducing the pressure of said neutralizing agent; means for metering the flow of said neutralizing agent through said conduit means; and pressure responsive means actuating said means for reducing the pressure of said neutralizing agent disposed in said conduit means, said pressure responsive means being adapted to open in response to a decrease in pressure to said storage tank to permit flow of said neutralizing agent into said storage tank.

2. In an apparatus for automatically introducing a neutralizing agent into the vapor space of a storage tank in combination a neutralizing agent source; a means for filtering foreign matter from said agent; a high pressure regulating means adapted to reduce the pressure of and control the flow of said agent; a metering orifice; and a low pressure regulating means actuating said high pressure regulating means adapted to open to permit flow of said agent therethrough in response to a change of pressure on its downstream side, all being connected serially through suitable tubing to said vapor space.

3. The apparatus of claim 2 for automatically introducing a neutralizing agent into the vapor space of a storage tank wherein the high pressure regulator comprises an upper body member and a lower body member with a diaphragm disposed between said members; an upright conduit extending through said lower body member; a plug threaded into the under side of said lower body member; a valve head with resilient gasket material on its upper surface; a valve stem attached to the under side of said valve head, said valve stem riding in a recess in said plug; a compression spring encompassing said valve stem and resting on a seat in said plug, said spring being in contact with the under side of said valve head and tending to force said gasket material against the lower end of said upright conduit; outlet and inlet conduits extending laterally from said upright conduit, said conduits being so disposed that when said gasket material is against the lower end of said upright conduit said outlet conduit still connects with said upright conduit while said inlet conduit is blocked by said valve head; a screw member threaded through said upper body member and adapted to compress and release a compression spring resting on said diaphragm; and an upright member positioned in said upright conduit and adapted to move downwardly in response to pressure from said diaphragm to force said valve head away from the lower end of said upright conduit.

4. The high pressure regulator of claim 3 wherein the under side of said plug has a slot therein in which a cam is pivoted, said cam being adapted to move said valve stem upwardly so as to seat said gasket material against the lower end of said upright conduit.

References Cited in the file of this patent

UNITED STATES PATENTS

| | | |
|---|---|---|
| 347,213 | Walker | Aug. 10, 1886 |
| 1,346,921 | Terry | July 20, 1920 |
| 1,589,659 | Philips | June 22, 1926 |
| 2,102,289 | Smolensky | Dec. 14, 1937 |
| 2,108,312 | Holmes | Feb. 15, 1938 |
| 2,199,661 | Gamble | May 7, 1940 |
| 2,326,968 | Pomeroy | Aug. 17, 1943 |
| 2,330,051 | Heidt | Sept. 21, 1943 |
| 2,357,318 | Donaldson | Sept. 5, 1944 |
| 2,358,819 | Morris | Sept. 26, 1944 |
| 2,571,739 | Marsh | Oct. 16, 1951 |
| 2,643,178 | Wachter | June 23, 1953 |
| 2,655,936 | Wexler | Oct. 20, 1953 |